Sept. 6, 1960  L. M. MORRISH ET AL  2,951,724
BUMPER EXHAUST
Filed Sept. 20, 1955  2 Sheets-Sheet 1
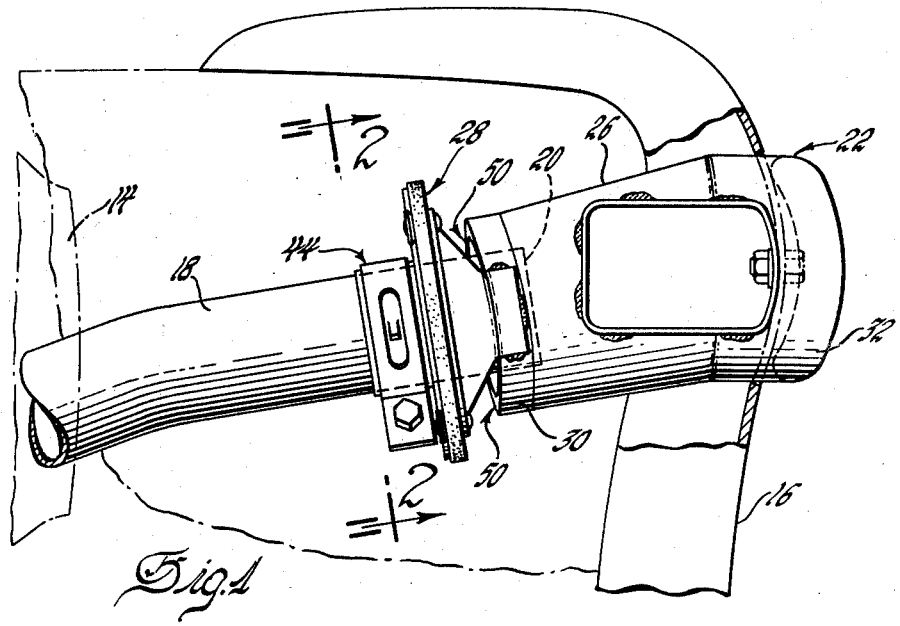
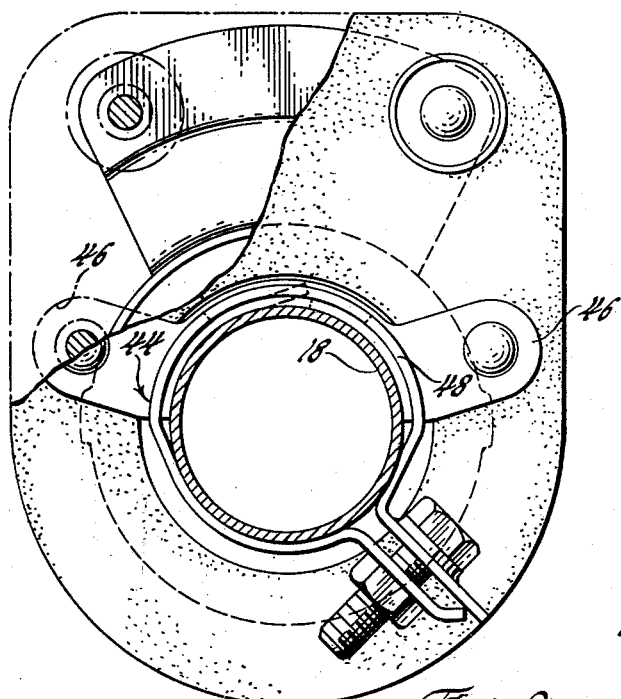
INVENTORS
Leonard M. Morrish &
BY William D. Pittsley
L.D. Burek
ATTORNEY

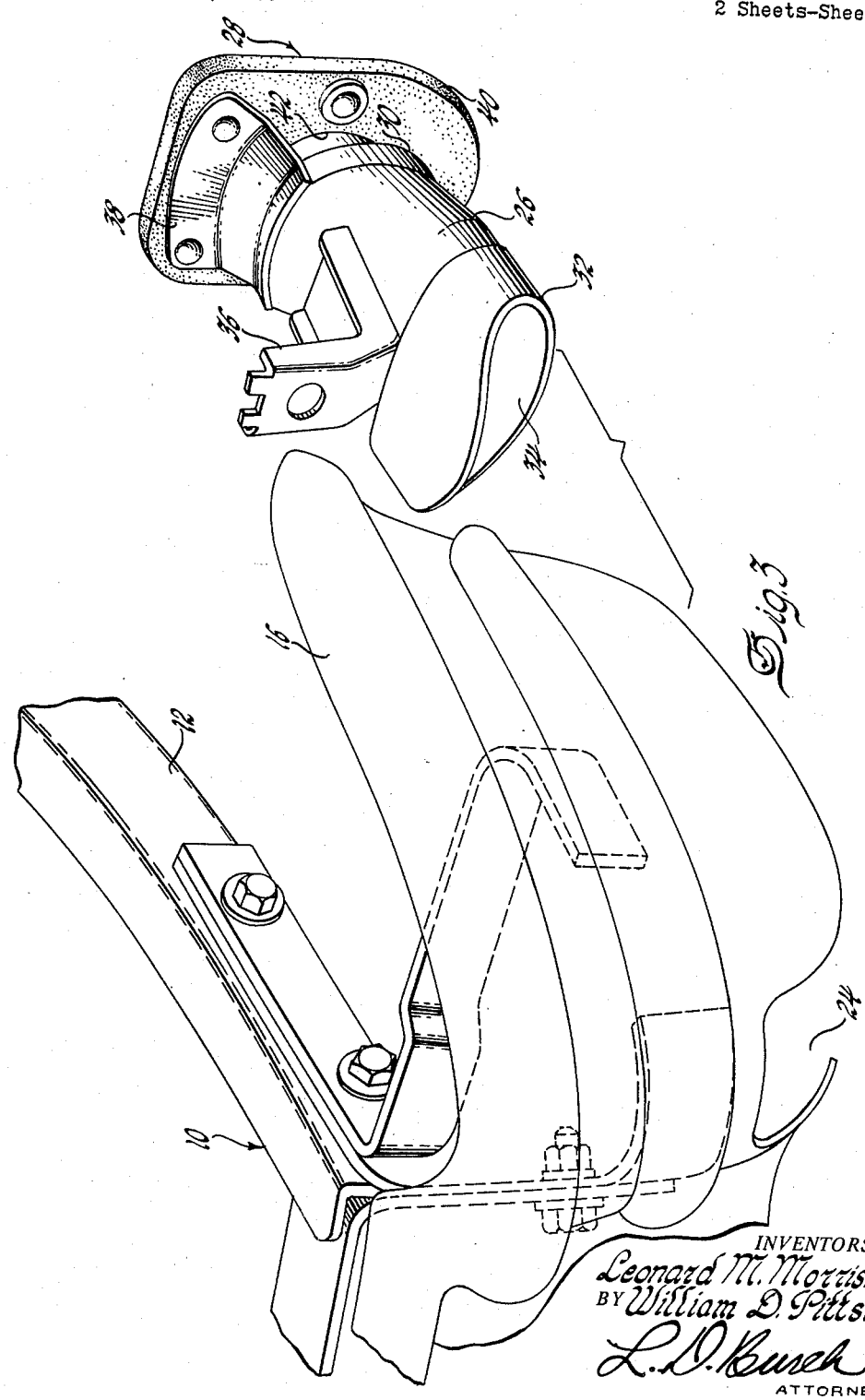

2,951,724
Patented Sept. 6, 1960

2,951,724

BUMPER EXHAUST

Leonard M. Morrish and William D. Pittsley, Flint, Mich., assignors to General Motors Corporation, Detroit, Mich., a corporation of Delaware Filed Sept. 20, 1955, Ser. No. 535,502

1 Claim. (Cl. 293—69)

The present invention relates to exhaust means for an automotive vehicle and more particularly to means for directing the stream of engine exhaust gases through an aperture in a body member such as a bumper.

Automotive vehicles normally employ an engine located in the forward portions thereof and having an exhaust system which is adapted for discharging the engine exhaust gases from the rear of the vehicle. The present engineering and styling trend in the automotive field is to continually lower the vehicle body and to increase the amount of rear overhang thereof. As a result, the discharge end of the exhaust system, which is disposed in the rear of the vehicle, is frequently damaged from striking obstructions unless the height of the exhaust system is at least as high as the lower extremities of the body. In order to obtain this height and still allow a free path for the discharge of the exhaust gases into the atmosphere, it is desirable to place an aperture in some body member such as the rear bumper through which the gases may flow into the atmosphere.

It is an object of this invention to provide exhaust means for supporting the discharge end of an exhaust in properly spaced relation to an aperture in the rear bumper.

It is a further object to provide a sound deadening device in such an exhaust means for supporting the discharge end of the exhaust pipe and preventing the transfer of the vibrations in the exhaust system to the vehicle body.

It is a further object to provide a drainage device in such an exhaust means to substantially eliminate any discoloration or deterioration of the body members as a result of any corrosive liquids and/or any heat present in the exhaust gases.

These and other objects are to be accomplished by providing exhaust mounting means having a tubular discharge member mounted on a rear bumper and a sound deadening member that supports the discharge end of the exhaust pipe in the discharge member in spaced relation thereto to form an atmospheric vent to allow cool air to flow therethrough and that forms a shield to prevent the entrance of foreign objects into the vent.

These and other objects will become more fully apparent from the reading of the specification.

In the two sheets of drawings:

Figure 1 is a plan view of a portion of an exhaust system employing the present invention.

Figure 2 is a cross sectional view taken substantially along the plane of line 2—2 in Figure 1.

Figure 3 is an exploded perspective view of the present invention.

Referring to the drawings in more detail, the present invention may be embodied in an automotive vehicle 10 having a frame 12 supported by a plurality of ground engaging wheels 14. A body may be mounted on this frame and a rear bumper 16 may extend across the rear end thereof. The vehicle 10 may be driven by an engine mounted on the forward portion of the frame and have an exhaust system including one or more tailpipes 18 which have the discharge ends 20 thereof located immediately in front of the rear bumper 16. Exhaust means 22 may be provided for each tailpipe 18 for retaining the discharge end 20 thereof properly spaced for directing a stream of engine exhaust gases through an opening 24 in the lower portion of the bumper 16.

In the present instance the exhaust means 22 includes a tubular discharge member 26 and a support 28 of sound deadening material.

The present discharge member 26 is a tube or sleeve having a circular inlet 30 and a flattened outlet 32 and a passage 34 that extends therebetween suitable for allowing a flow of exhaust gases therethrough. The outlet end 32 of the member 26 is styled and/or shaped to correspond to the shape of the opening 24 in the bumper 16, thus allowing the outlet end 32 to be disposed in the opening 24. In order to retain the discharge member 26 properly positioned in the opening 24, mounting means may be provided for securing the member 26 to the bumper 16. In the present instance this mounting means is a bracket 36 for rigidly securing the tubular member 26 to the bumper 16.

The support 28 may include a second bracket 38 which is secured to the discharge member 26 immediately adjacent the inlet end 30 thereof. This bracket 38 projects forwardly from the forward end of the tubular member 26 so as to overhang the inlet opening 30. A resilient member 40 of sound absorbent material may have the upper end thereof secured to this bracket 38 and hang downwardly across the inlet end 30 of the discharge member 26. This member 40 may have an opening 42 therethrough that registers with the inlet end 30 and is adapted to receive the discharge end 20 of the tailpipe 18 so that it will terminate inside of the discharge member 26. Thus the tailpipe 18 will be positioned to discharge straight through the tubular member 26 and into the atmosphere.

A clamp 44 may be secured to the sound absorbent member 40 and the tailpipe 18 to retain the tailpipe 18 properly positioned. In the present instance this clamp 44 includes a pair of arms 46 riveted to the sound absorbent member 40 and a split ring 48 which extends around the periphery of the tailpipe 18 and is tightened thereon by means of a nut and bolt. The arms 46 are preferably attached to the support member 40 remote from the point at which the bracket 38 is secured thereto. This will permit the member 40 to flex freely and allow longitudinal movement of the exhaust pipe 18 as a result of the thermal expansion and contraction of the exhaust system and/or resilient movement of the bumper 16.

As previously stated the resilient member 40 is preferably disposed in spaced relation to the inlet end 30 of the tubular discharge member so as to form a vent 50 therebetween. Accordingly, movement of the vehicle 10 and the flow of exhaust gases through the discharge member 26 will tend to produce a flow of atmospheric air through the vent 50. This air will form a protective envelope around the exhaust gases and/or mix therewith. This will tend to cool the gases and the discharge member 26 so as to prevent excessive heating thereof and also tend to prevent the hot gases from coming into direct contact with the decorative surfaces of the bumper 16, etc., and causing staining and/or corrosion of these surfaces. It should also be noted that since the forward end 30 of the tubular discharge member 26 is lower than the outlet end 32, any liquid condensate may drain from the inlet end 30 of the discharge member 26 rather than contacting the exterior surface of the bumper 16.

Since the exhaust means are located directly behind the ground engaging wheels 14, there may be a tendency for gravel and other debris on the road to be thrown upwardly towards the inlet end 30 of the tubular discharge member 26. However, the sound absorbent member 40 is disposed in substantial alignment between the inlet end 30 of the discharge member 26 and the road wheels and is of sufficient size to form a protective shield for preventing such foreign objects entering the discharge member. Accordingly, any debris thrown by the wheel will strike the forward side of the sound absorbent member 40 and be harmlessly deflected away from the vent entrance.

It will therefore be seen that a new and highly improved exhaust discharge means has been provided.

It is to be understood that, although the invention has been described with specific reference to a particular embodiment thereof, it is not to be so limited since changes and alterations therein may be made which are within the full intended scope of this invention as defined by the appended claim.

We claim:

Exhaust means for an automotive vehicle having an engine and an exhaust system and a body member, said body member having a wall providing a slot in a lower edge thereof, a tubular element having an inlet and an outlet end and projecting through said slot, a bracket secured to said element adjacent said discharge end and projecting from said element and being secured to said wall, a second bracket secured to said element adjacent said inlet end of said element and projecting upwardly and forwardly beyond said inlet end of said element, a flexible insulating supporting and absorbing member secured to said second bracket above said tubular element and extending downwardly adjacent to and in front of said bracket and adjacent but transversely across and spaced from said inlet end of said element sufficiently to provide an air space between said tubular element and said insulating member, said insulating member having an aperture aligned with said inlet end of said element, and a conduit forming a part of said exhaust system and extending through said aperture and being supported by said insulating member, the end of said conduit having a smaller diameter than that of said tubular element and terminating closely adjacent the inlet end of said element whereby exhaust gas is discharged into and through said element and atmospheric air is caused to flow into the space between said insulating member and the inlet end of said element and through said element.

References Cited in the file of this patent

UNITED STATES PATENTS

| | | |
|---|---|---|
| 1,217,615 | McDowell | Feb. 27, 1917 |
| 1,922,848 | Harley | Aug. 15, 1933 |
| 2,290,621 | Riesing | July 21, 1942 |
| 2,308,969 | Riesing | Jan. 19, 1943 |
| 2,318,006 | Mercier | May 4, 1943 |
| 2,489,480 | Chester | Nov. 29, 1949 |
| 2,515,391 | Arbib | July 18, 1950 |
| 2,568,409 | Phillips | Sept. 18, 1951 |
| 2,841,348 | Stahlmuth | July 11, 1958 |
| 2,850,314 | Haigh | Sept. 2, 1958 |